United States Patent
Phillips et al.

(10) Patent No.: US 11,868,952 B2
(45) Date of Patent: *Jan. 9, 2024

(54) SYSTEMS AND METHODS FOR DETERMINING AN OPTIMAL LOCAL SERVICE LOCATION BASED ON DELIVERY ADDRESS AND TIME

(71) Applicant: Capital One Services, LLC, McLean, VA (US)

(72) Inventors: Jeremy Phillips, Brooklyn, NY (US); Catherine Bousquet, Brooklyn, NY (US); Nitiben Sheth, Lake Hiawatha, NJ (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/889,151

(22) Filed: Aug. 16, 2022

(65) Prior Publication Data

US 2022/0391842 A1 Dec. 8, 2022

Related U.S. Application Data

(63) Continuation of application No. 17/005,638, filed on Aug. 28, 2020, now Pat. No. 11,449,824.

(51) Int. Cl.
*G06Q 10/0835* (2023.01)
*G06N 20/00* (2019.01)
(Continued)

(52) U.S. Cl.
CPC ....... *G06Q 10/08355* (2013.01); *G06F 9/547* (2013.01); *G06F 16/29* (2019.01);
(Continued)

(58) Field of Classification Search
None
See application file for complete search history.

(56) References Cited

U.S. PATENT DOCUMENTS

| 6,385,541 B1 | 5/2002 | Blumberg et al. |
| 6,510,383 B1 * | 1/2003 | Jones ................... G01C 21/343 |
| | | 701/411 |

(Continued)

FOREIGN PATENT DOCUMENTS

| WO | WO-0165523 A1 * | 9/2001 | ........... G01C 21/343 |
| WO | WO-2014033559 A1 * | 3/2014 | ............. G06Q 10/08 |

OTHER PUBLICATIONS

Ramona "Model for Determining the Optimum Location for Performance Improvement in Supply-Chain Strategies", Dec. 2015, European Journal of Interdisciplinary Studies, pp. 39-54. (Year: 2015).*

(Continued)

*Primary Examiner* — Romain Jeanty
(74) *Attorney, Agent, or Firm* — HUNTON ANDREWS KURTH LLP

(57) ABSTRACT

Systems and methods for determining an optimal delivery location based on delivery address and delivery time are provided. An example method includes receiving an online order from a user application installed on a user device; generating a map comprising a dynamic display of a local service area polygon associated with the online order and transmitting the map to the user application; transmitting to the user application a request for a delivery address; upon receipt of the delivery address, querying the delivery address to determine whether the local service area polygon includes the delivery address; transmitting to the user application a request for a delivery time; upon receipt of the delivery time, automatically recommending an optimal delivery location and time within the local service area polygon based on the
(Continued)

delivery address and delivery time; and executing a delivery of the online order based on the optimal delivery location and time.

20 Claims, 5 Drawing Sheets

(51) Int. Cl.
H04L 67/141 (2022.01)
G06F 16/9537 (2019.01)
G06Q 30/0204 (2023.01)
G06Q 10/0833 (2023.01)
G06F 9/54 (2006.01)
G06F 16/29 (2019.01)
G06Q 30/0601 (2023.01)
H04L 67/53 (2022.01)
G06F 40/40 (2020.01)

(52) U.S. Cl.
CPC ......... G06F 16/9537 (2019.01); G06N 20/00 (2019.01); G06Q 10/0833 (2013.01); G06Q 30/0205 (2013.01); G06Q 30/0633 (2013.01); H04L 67/141 (2013.01); H04L 67/53 (2022.05); G06F 40/40 (2020.01)

(56) References Cited

U.S. PATENT DOCUMENTS

| | | |
|---|---|---|
| 6,915,204 B1 | 7/2005 | Heideman |
| 7,516,013 B1 | 4/2009 | Hamilton, II et al. |
| 8,122,036 B2 | 2/2012 | Bastani et al. |
| 8,620,576 B1 | 12/2013 | Papadopolo et al. |
| 9,470,532 B2 | 10/2016 | Pellow et al. |
| 9,824,388 B2 | 11/2017 | Croy et al. |
| 9,886,731 B2 | 2/2018 | Ding et al. |
| 2001/0047285 A1 | 11/2001 | Borders et al. |
| 2003/0126150 A1 | 7/2003 | Chan |
| 2004/0068443 A1 | 4/2004 | Hopson et al. |
| 2005/0101333 A1 | 5/2005 | Raith |
| 2006/0026046 A1 | 2/2006 | Yaron et al. |
| 2007/0260741 A1 | 11/2007 | Bezancon |
| 2009/0024316 A1 | 1/2009 | Sutanto |
| 2010/0070334 A1 | 3/2010 | Monteverde |
| 2010/0100233 A1 | 4/2010 | Lu |
| 2011/0258252 A1 | 10/2011 | Torres Ramon et al. |
| 2011/0275441 A1 | 11/2011 | Wilson |
| 2012/0259732 A1 | 10/2012 | Sasankan et al. |
| 2013/0023289 A1 | 1/2013 | Gorgens |
| 2013/0090965 A1 | 4/2013 | Rivere |
| 2013/0288692 A1* | 10/2013 | Dupray ................. H04W 64/00 455/450 |
| 2013/0339076 A1 | 12/2013 | Baranda |
| 2014/0004796 A1 | 1/2014 | Cakulev et al. |
| 2014/0156327 A1 | 6/2014 | Cai |
| 2014/0236724 A1 | 8/2014 | Jain |
| 2014/0324632 A1 | 10/2014 | Enomoto et al. |
| 2014/0324725 A1 | 10/2014 | Edmonds et al. |
| 2015/0294266 A1 | 10/2015 | Siragusa |
| 2017/0024685 A1 | 1/2017 | DiSorbo |
| 2017/0068872 A1 | 3/2017 | Short et al. |
| 2017/0220966 A1 | 8/2017 | Wang |
| 2017/0256015 A1 | 9/2017 | Moecklin et al. |
| 2018/0005309 A1 | 1/2018 | Croy et al. |
| 2018/0107346 A1 | 4/2018 | Wilson |
| 2019/0377349 A1 | 12/2019 | van der Merwe et al. |

OTHER PUBLICATIONS

Yuri, "Improving Global Supply Chain and Last-Mile Delivery with Machine Learning", Dec. 2018, Technology and Operation Management, pp. 1-6 (Year: 2018).

* cited by examiner

SYSTEMS AND METHODS FOR DETERMINING AN OPTIMAL LOCAL SERVICE LOCATION BASED ON DELIVERY ADDRESS AND TIME

CROSS-REFERENCE TO RELATED APPLICATION

This application is a continuation of U.S. patent application Ser. No. 17/005,638 filed Aug. 28, 2020, the complete disclosure of which is incorporated herein by reference in its entirety.

FIELD OF THE INVENTION

The present disclosure relates to the logistics technology, and more particularly, to systems and methods for determining an optimal local service location based on delivery address and delivery time.

BACKGROUND

Online shopping is becoming increasingly popular. Logistics technology, including order fulfillment and product delivery, can play a significant role for both customers and merchants. Customers may place an order via a mobile application for a physical product and would like have that product delivered to them at their preferred location and time. Meanwhile, merchants supplying that physical product may want to offer the fastest and cheapest possible shipping solution to get the physical product to the customers at their preferred location and time. The existing logistics technologies, however, do not meet these challenges. For example, delivery or pickup locations are not as customizable or as flexible as customers may desire.

These and other deficiencies exist. Accordingly, there is a need to provide customers and merchants with an appropriate solution that overcomes these deficiencies to provide optimal local service locations.

SUMMARY

Aspects of the disclosed technology include systems and methods for determining an optimal local service location based on delivery address and time.

Embodiments of the present disclosure provide a system for determining an optimal local service location based on delivery address and time. The system may comprise a memory, a security layer, and a microservice repository layer including one or more processors. The one or more processors is configured to be coupled to the memory, the security layer, and an application programming interface (API) that enables transmission of real-time data. The microservice repository layer is configured to: establish, via a network, a secure connection between a user device and the microservice repository layer; receive an online order from a user application installed on the user device; generate, in real-time, a map comprising a dynamic display of a local service area polygon associated with the online order and transmit the map to the user application; transmit to the user application a request for a delivery address for delivering the online order; upon receipt of the delivery address from the user application, query the delivery address to determine whether the local service area polygon includes the delivery address; transmit to the user application a request for a delivery time for delivering the online order; upon receipt of the delivery time from the user application, automatically recommend an optimal delivery location and time within the local service area polygon based on the delivery address and delivery time; and execute a delivery of the online order based on the optimal delivery location and time.

Embodiments of the present disclosure provide a method for determining an optimal local service location based on delivery address and time. The method may comprise: establishing, via a network, a secure connection between a user device and a microservice repository layer; receiving an online order from a user application installed on the user device; generating, in real-time, a map comprising a dynamic display of a local service area polygon associated with the online order and transmitting the map to the user application; transmitting to the user application a request for a delivery address for delivering the online order; upon receipt of the delivery address from the user application, querying the delivery address to determine whether the local service area polygon includes the delivery address; transmitting to the user application a request for a delivery time; upon receipt of the delivery time from the user application, automatically recommending an optimal delivery location and time within the local service area polygon based on the delivery address and delivery time; and executing a delivery of the online order based on the optimal delivery location and time.

Embodiments of the present disclosure provides a system. The system may comprise a memory, a security layer, and a microservice repository layer including one or more processors. The one or more processors is configured to be coupled to the memory, the security layer, and an application programming interface (API) that enables transmission of real-time data. The microservice repository layer is configured to: establish, via a network, a secure connection between a user device and the microservice repository layer; receive an online order from a user application installed on the user device; generate, in real-time, a map comprising a dynamic display of a local service area polygon associated with the online order and transmit the map to the user application; transmit to the user application a request for a delivery address for delivering the online order; upon receipt of the delivery address from the user application, query the delivery address to determine whether the local service area polygon includes the delivery address; transmit to the user application a request for a delivery time for delivering the online order; and upon receipt of the delivery time from the user application, automatically recommend an optimal delivery location and time within the local service area polygon based on the delivery address and delivery time. The system may further comprise a recommendation engine that utilizes machine learning and natural language processing to process and cluster the received real-time data to generate recommendations of an optimal courier to execute a delivery of the online order based on the optimal delivery location and time.

Further features of the disclosed methods and systems, and the advantages offered thereby, are explained in greater detail hereinafter with reference to specific example embodiments illustrated in the accompanying drawings.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention. Although the below description of example embodiments of the present disclosure is provided for online order delivery, the present disclosure may equally be applicable to item shipment by customers.

Example embodiments of the present disclosure provide systems and methods for determining an optimal local service location based on delivery address and time. When a customer places an online order, the customer would like the online order to be delivered to a desired location at a desired time. To meet the requirements of the customer, the merchant offering and/or fulfilling the online order may have the online order directed to a closest available local service location for local service either via local carrier or via customer pickup. The closest available local service location may be one example of an optimal local service location. The optimal local service location may be determined based on, at least a delivery address and a delivery time received from the customer. Other factors may also been taken into account for determining the optimal delivery location, including, but not limited to, weather condition, availability of a local service location, the number of delivery requests at a local service location, and traffic condition around a local service location.

As used herein, a local service location refers to any physical local location capable of receiving online order deliveries. The local service location may include, but is not limited to, a local business building, a local bank branch office, a local courier office, a local school office, a local store of the merchant from which the online order is placed, a local restaurant, and a dedicated local location. When an optimal local service location is identified, the online order may be delivered to that optimal local service location, for example, by a long distance courier, a local courier, or a dedicated transportation owned by the merchant. Once the online order arrives at the optimal local service location, the online order may be picked up by the customer or may be further delivered to the customer by a local courier.

Figure 1:
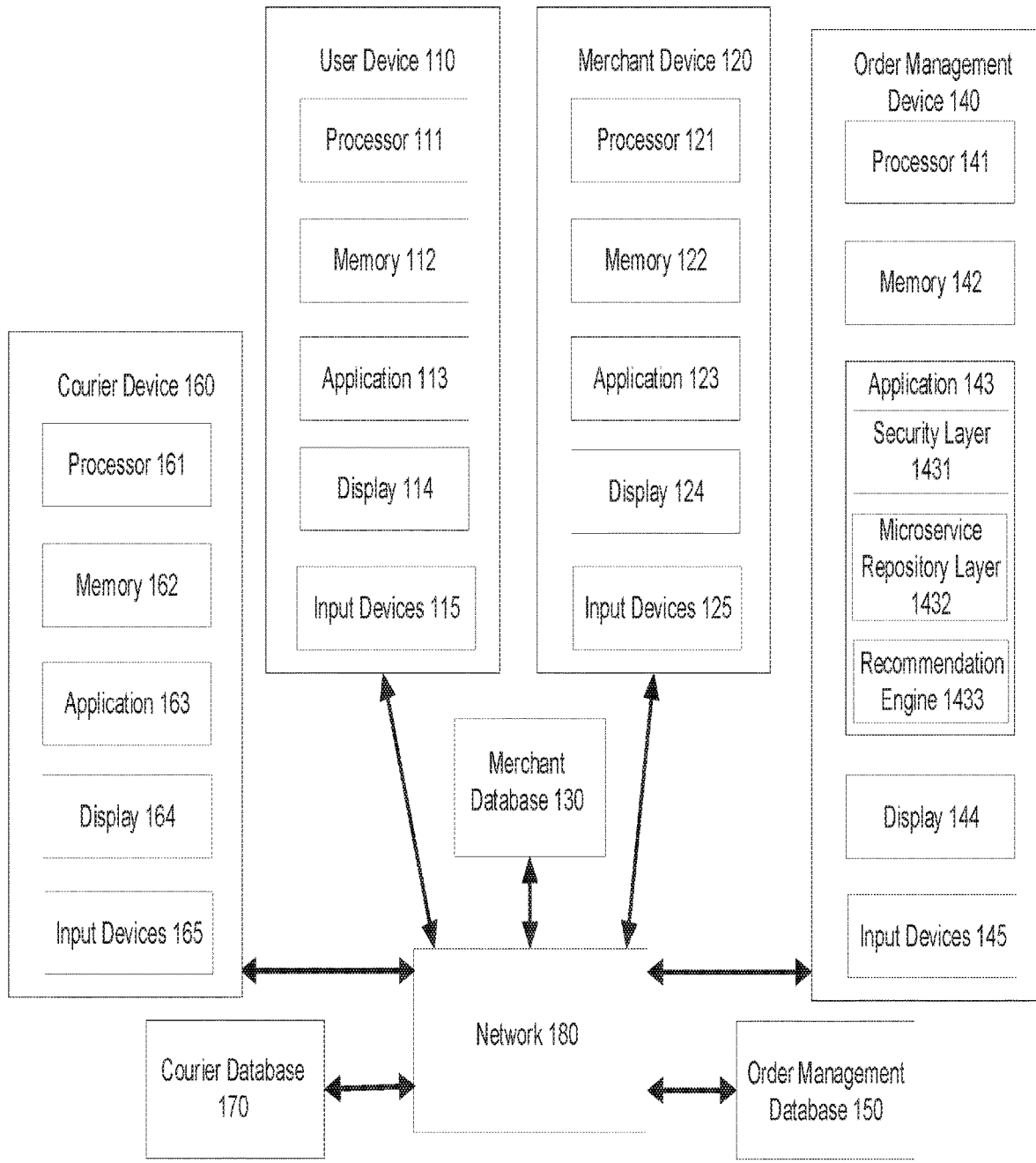
FIG. 1 is a diagram of a system of determining an optimal local service location based on delivery address and time according to an example embodiment.

FIG. 1 illustrates a system 100 for determining an optimal local service location based on delivery address and time according to an example embodiment. As further discussed below, the system 100 may include a user device 110, a merchant device 120, a merchant database 130, an order management device 140, an order management database 150, a courier device 160, a courier database 170 and a network 180 via which the above components may be in data communication with one another. Although FIG. 1 illustrates single instances of the components, the system 100 may include any number of components.

The user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a smartcard, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 110 may include a processor 111, a memory 112, an application 113, a display 114 and input devices 115. The processor 111 may be a processor, a microprocessor, or other processor, and the user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and user deice may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 112 may be configured to store one or more software applications, such as application 113, and other data, such as user information.

The application 113 may comprise one or more software applications comprising instructions for execution on the user device 110. In some examples, the user device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described below. Such processes may be implemented in software, such as software modules, for execution by computers or other machines. The application 113 may provide graphic user interfaces (GUIs) through which user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder. These devices may be used to enter information and interact with the software and other devices described herein.

The merchant device 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a smartcard, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The merchant device 120 may include a processor 121, a memory 122, and an application 123. The processor 121 may be a processor, a microprocessor, or other processor, and the merchant device 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and user deice may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 122 may be configured to store one or more software applications, such as application 122, and other data, such as merchant information.

The application 123 may comprise one or more software applications comprising instructions for execution on the data device 123. In some examples, the merchant device 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described above. Such processes may be implemented in software, such as software modules, for execution by computers or other machines. The application 123 may provide graphic user interfaces (GUIs) through which user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The merchant device 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the merchant device 120 that is available and supported by the merchant device 120, such as a touch-screen, keyboard, mouse, cursor-control device, touch-screen, microphone, digital camera, video recorder or camcorder. These devices may be used to enter information and interact with the software and other devices described herein.

The merchant database 130 may be one or more databases configured to store data, including without limitation, product and inventory information and customer information. The merchant database 130 may comprise a relational database, a non-relational database, or other database implementations, and any combination thereof, including a plurality of relational databases and non-relational databases. In some examples, the merchant database 130 may comprise a desktop database, a mobile database, or an in-memory database. Further, the merchant database 130 may be hosted internally by the merchant device 120 or may be hosted externally of the merchant device 120, such as by a server, by a cloud-based platform, or in any storage device that is in data communication with the merchant device 120.

The order management device 140 may be a network-enabled computer device. Exemplary network-enabled computer devices include, without limitation, including, a server, a network appliance, a personal computer, a workstation, a phone, a handheld personal computer, a personal digital assistant, a thin client, a fat client, an Internet browser, a mobile device, a kiosk, a smartcard, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The order management device 140 may include a processor 141, a memory 142, and an application 143. The processor 141 may be a processor, a microprocessor, or other processor, and the order management device 140 may include one or more of these processors. The processor 141 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 141 may be coupled to the memory 142. The memory 142 may be a read-only memory, write-once read-multiple memory or read/write memory, e.g., RAM, ROM, and EEPROM, and user deice may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 142 may be configured to store one or more software applications, such as application 143, and other data, such as online order information.

The application 143 may comprise one or more software applications comprising instructions for execution on the merchant device 140. For example, the application 143 may comprise a security layer 1431, a microservice repository layer 1432, and a recommendation engine 1433. In some examples, the order management device 140 may execute one or more applications, such as software applications, that enable, for example, network communications with one or more components of the system 100, transmit and/or receive data, and perform the functions described herein. Upon execution by the processor 141, the application 143 may provide the functions described in this specification, specifically to execute and perform the steps and functions in the process flows described below. Such processes may be implemented in software, such as software modules, for execution by computers or other machines. Such processes may further involve hardware such as processors and memory. The application 143 may provide graphic user interfaces (GUIs) through which user may view and interact with other components and devices within system 100. The GUIs may be formatted, for example, as web pages in HyperText Markup Language (HTML), Extensible Markup Language (XML) or in any other suitable form for presentation on a display device depending upon applications used by users to interact with the system 100.

The order management device 140 may further include a display 144 and input devices 145. The display 144 may be any type of device for presenting visual information such as a computer monitor, a flat panel display, and a mobile device screen, including liquid crystal displays, light-emitting diode displays, plasma panels, and cathode ray tube displays. The input devices 145 may include any device for entering information into the order management device 140 that is available and supported by the order management device 140, such as a touch-screen, keyboard, mouse, cursor-control device, touch-screen, microphone, digital camera, video recorder or camcorder. These devices may be used to enter information and interact with the software and other devices described herein.

The security layer 1431 may be configured to facilitate establishing secure communications between the order management device 140 and other components of the system 100. Security measures, including encryption, multifactor authentication, biometric authentication, and other measures can be implemented to increase the security of the information transmitted over the established communications. The microservice repository layer 1432 may comprise a structured application as a collection of service modules that may have well-defined interfaces and operations to allow flexible and reliable deployment of the service modules. The microservice repository layer 1432 may be configured to provide the functions described in this specification, specifically to execute and perform the steps and functions in the process flows described below. The recommendation engine 1433 may be configured to facilitate recommending an optimal location service location and delivery time for delivering an online order, a long distance courier or a local courier for delivering an online order.

The order management database 150 may be one or more databases configured to store data, including without limitation, online order information, customer information and courier information. The order management database 150 may comprise a relational database, a non-relational database, or other database implementations, and any combination thereof, including a plurality of relational databases and non-relational databases. In some examples, the order management database 150 may comprise a desktop database, a mobile database, or an in-memory database. Further, the order management database 150 may be hosted internally by the order management device 140 or may be hosted externally of the order management device 140, such as by a server, by a cloud-based platform, or in any storage device that is in data communication with the order management device 140.

The courier device 160 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a smartcard, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The courier device 160 may include a processor 161, a memory 162, an application 163, a display 164 and input devices 165. The processor 161 may be a processor, a microprocessor, or other processor, and the user device 110 may include one or more of these processors. The processor 161 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 161 may be coupled to the memory 162. The memory 162 may be a read-only memory, write-once read-multiple memory or read/write memory, e.g., RAM, ROM, and EEPROM, and user deice may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 162 may be configured to store one or more software applications, such as application 163, and other data, such as courier information.

The application 163 may comprise one or more software applications comprising instructions for execution on the courier device 160. In some examples, the courier device 160 may execute one or more applications, such as software applications, that enable, for example, network communications with one or more components of the system 100, transmit and/or receive data, and perform the functions described herein. Upon execution by the processor 161, the application 163 may provide the functions described in this specification, specifically to execute and perform the steps and functions in the process flows described below. Such processes may be implemented in software, such as software modules, for execution by computers or other machines. The application 163 may provide graphic user interfaces (GUIs) through which user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The courier device 160 may further include a display 164 and input devices 165. The display 164 may be any type of device for presenting visual information such as a computer monitor, a flat panel display, and a mobile device screen, including liquid crystal displays, light-emitting diode displays, plasma panels, and cathode ray tube displays. The input devices 165 may include any device for entering information into the courier device 160 that is available and supported by the courier device 160, such as a touch-screen, keyboard, mouse, cursor-control device, touch-screen, microphone, digital camera, video recorder or camcorder. These devices may be used to enter information and interact with the software and other devices described herein.

The courier database 170 may be one or more databases configured to store data, including without limitation, online order information, customer information and courier information. The courier database 170 may comprise a relational database, a non-relational database, or other database implementations, and any combination thereof, including a plurality of relational databases and non-relational databases. In some examples, the courier database 170 may comprise a desktop database, a mobile database, or an in-memory database. Further, the courier database 170 may be hosted internally by the courier device 160 or may be hosted externally of the courier device 160, such as by a server, by a cloud-based platform, or in any storage device that is in data communication with the courier device 160

The system 100 may include one or more networks 180. In some examples, the network 180 may be one or more of a wireless network, a wired network or any combination of wireless network and wired network, and may be configured to connect the user device 110 to the merchant device 120, the user device 110 to the order management device 140, the user device 110 to the courier device 160, the merchant device 120 to the order management device 140, the merchant device 120 to the merchant database 130, the order management device 140 to the order management database 150, and the courier device 160 to the courier database 170. For example, the network 180 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 180 may include, without limitation, telephone lines, fiber optics, IEEE Ethernet 902.3, a wide area network, a wireless personal area network, a LAN, or a global network such as the Internet. In addition, the network 180 may support an Internet network, a wireless communication network, a cellular network, or the like, or any combination thereof. The network 180 may further include one network, or any number of the exemplary types of networks mentioned above, operating as a stand-alone network or in cooperation with each other. The network 180 may utilize one or more protocols of one or more network elements to which they are communicatively coupled. The network 180 may translate to or from other protocols to one or more protocols of network devices. Although the network 180 is depicted as a single network, it should be appreciated that according to one or more examples, the network 180 may comprise a plurality of interconnected networks, such as, for example, the Internet, a service provider's network, a cable television network, corporate networks, such as credit card association networks, and home networks. The network 180 may further comprise, or be configured to create, one or more front channels, which may be publicly accessible and through which communications may be observable, and one or more secured back channels, which may not be publicly accessible and through which communications may not be observable.

In some examples, communications between the user device 110, the merchant device 120, the order management device 140 and the courier device 160 via the network 180 can occur via one or more front channels and one or more secure back channels. A front channel may be a communication protocol that employs a publicly accessible and/or unsecured communication channel such that a communication sent to the user device 110, the merchant device 120, the order management device 140 and/or the courier device 160 may originate from any other device, whether known or unknown to the user device 110, the merchant device 120, the order management device 140 and/or the courier device 160, if that device possesses the address (e.g., network address, Internet Protocol (IP) address) of the user device 110, the merchant device 120, the order management device 140 and/or the courier device 160. Exemplary front channels include, without limitation, the Internet, an open network, and other publicly-accessible communication networks. In some examples, communications sent via a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the user device 110, the merchant device 120, the order management device 140 and/or the courier device 160 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent via a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

Figure 2:
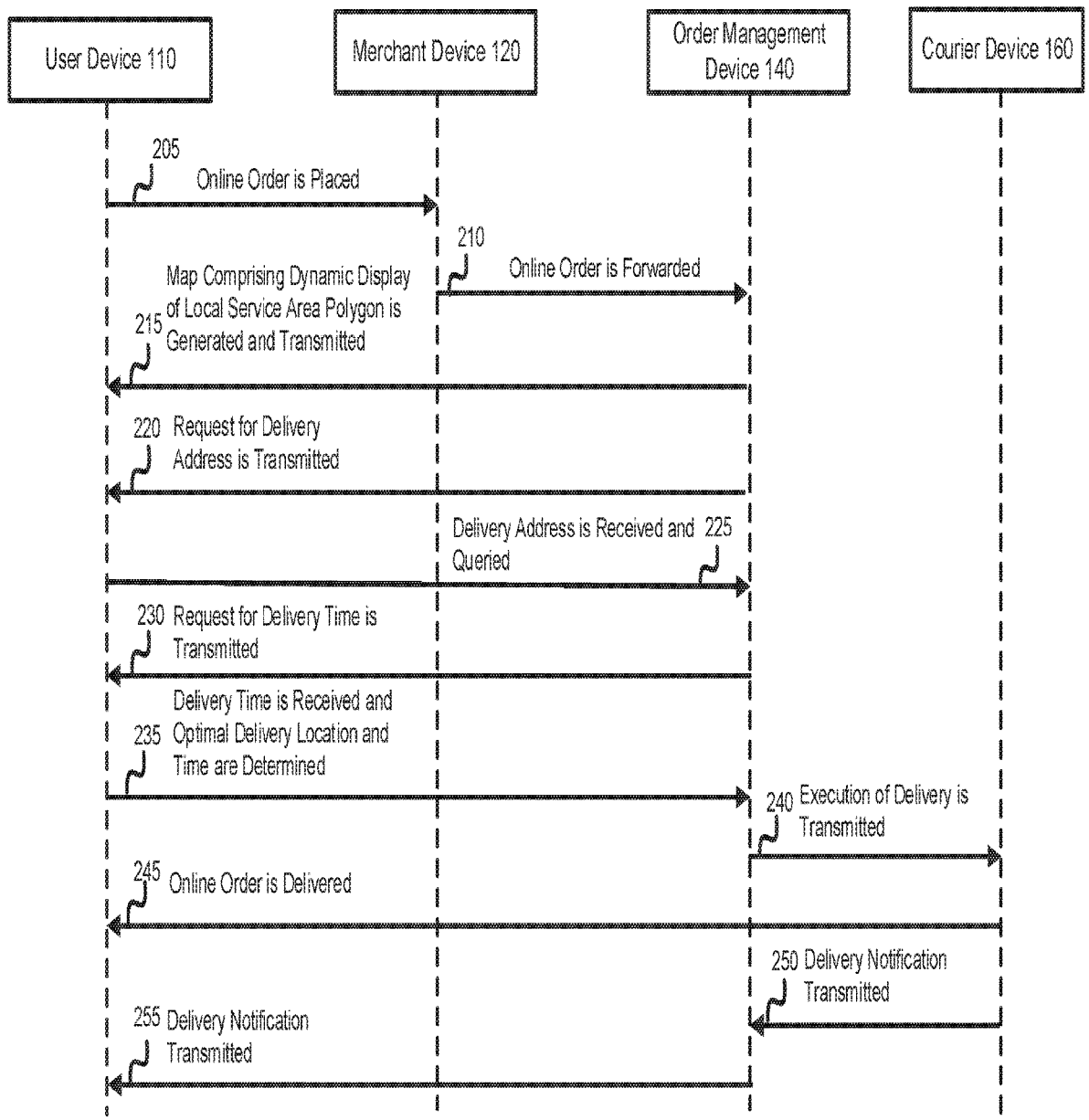
FIG. 2 is a sequence diagram for determining an optimal local service location based on delivery address and time according to an example embodiment.

FIG. 2 illustrates a sequence diagram of a method 200 for determining an optimal delivery location based on delivery address and delivery time according to an example embodiment. FIG. 2 may reference the same or similar components as those illustrated in FIG. 1, including the user device 110, the merchant device 120, the order management device 140, the courier device 160, and associated databases 130, 150 and 170 and network 180 (not shown in FIG. 2).

The user device 110 can be associated with a user and may be operated by that user. The merchant device 120 can be associated with a merchant, such as an online retailer, and may be operated by the merchant. The order management device 140 can be associated with the merchant or a third party, and may be operated by the merchant or the third party. The third party may a party who provides a dedicated online order management service. The courier device 160 can be associated with a courier and may be operated by a crew member of the courier.

The method 200 may commence at step 205, where a user of the user device 110 places an online order from the merchant. The user device 110 may establish a secure connection via the network 180 with the merchant device 120, for example, a secure back channel. The user of the user device 110 may place the online order via the secure connection from the merchant device 120, to purchase one or more products from the merchant. For example, the application 113 installed on the user 110 may comprise a web browser program that provides a user interface displayed on the display 114 for placing the online order by the user. The user may be required by the merchant device 120 to create or log into a personal shopping account on the merchant device 120 for placing the online order, and may be further required to complete a multifactor authentication.

The credentials (e.g., a user name, a password, a security code, a biometric identifier) and other private information (e.g., credit card information) associated with the personal shopping account may be transmitted via the secure connection from the user device 110 to the merchant device 120, and may be further stored on the merchant database 130 by the merchant device 120. In addition, information regarding the online order may be stored by the merchant device 120 on the merchant database 130. The information regarding the online order may include, but not limited to, the user's name, the user's telephone number, the user's email, the user's mailing address, the name and quantity of each item included in the online order, the unit price and total price of each item included in the online order, and the user's shipping address. The above operations on and interactions with the merchant device 120 may be performed through the application 123 deployed on the merchant device 120.

In some embodiments, the order management device 140 may not be a separate physical device. Functions and operations associated with the order management device 140 may be partially or wholly implemented on the user device 110 and/or the merchant device 120. For example, a software application incorporating the security layer 1431, the microservice repository layer 1433 and the recommendation engine 1433 may be installed on one or more of the user device 110, the user merchant device 120, etc.

In example embodiments where the order management device 140 may be a separate physical device, in step 210, information regarding the online order may be forwarded by the merchant device 120 to the order management device 140. The merchant device 120 may establish a secure connection via the network 180 with the order management device 140, for example, a secure back channel to transmit the information regarding the online order. The secure connection may be established through the application 123 on the merchant device 120 and the security layer 1431 deployed on the order management device 140. Upon receipt of the information regarding the online order, the information regarding the online order may be stored in the memory 142 of the order management device 140. The information regarding the online order may further be stored in the order management database 150 via the microservice repository layer 1432 included in the application 143 deployed on the order management device 140.

In step 215, a map comprising dynamic display of one or more local service area polygons may be generated by the order management device 140 and transmitted to the user device 110. The order management device 140 may establish a secure connection via the security layer 1431 with the user device 110, which may be used to transmit the map. The map may be generated via a tile screen. The one or more local service area polygons may be a cartographic display of regularly or irregularly shaped polygons and their attributes. The one or more local service area polygons may encompass a general delivery area offered by the order management device 140. One or more local service locations may be tagged inside a local service area polygon. A local service area polygon may comprise shading, symbols and numeric labeling, as well as languages to demonstrate the coverage of a local service area and to tag the encompassed local service locations.

The one or more local service area polygons may be generated based on the information regarding the online order. For example, the one or more local service area polygons may be generated based on a mailing address, a billing address, a zip code, a city, a county, and/or a telephone number, all of which may be associated with the online order and received by the order management device 140 from the merchant device 120. A generated local service area polygon may encompass an area corresponding to a zip code coverage, a county coverage, a town coverage, or a state coverage. The local service locations that has fallen into a local service area polygon may be tagged and displayed on the map with various colors, symbols, and shapes. The one or more local service polygons may be hard coded into an associated application code base included in the microservice repository layer 1432. The hard coded polygons may indicate latitudes and longitudes of the corresponding local delivery service areas. The latitude and longitude of each local delivery service location in the local delivery service areas may also be hard coded into an associated service or application in the microservice repository layer 1432. In other embodiments, the local service polygons may be subject to change, for example, based on order demand, delivery availability, transportation options, and other considerations.

The map comprising the dynamic display of the one or more local delivery service area polygons can be transmitted via the network 180 from the order management device 140 to the user device 110, and displayed on an interface of the display 114 of the user device 110. The user of the user device 114 may zoom in or zoom out the displayed map, for example, by finger movement or other input (e.g., an input devices such as a mouse, trackpad, or stylus). The one or more local delivery service area polygons may be dynamically enlarged or reduced accordingly to display more details of a local delivery service area or a wider range of the local delivery service area.

In some embodiments, the dynamic display of the one or more local service area polygons may comprise a heat map of one or more local delivery service location clusters. The heat map may indicate a distance from each of the local delivery service location clusters to a mailing address associated with the online order, a service location density of each of the local delivery service location clusters, and/or other information pertaining to the local delivery service location clusters. The heat map may take various forms, such as a tree map, a tiled heat map, and so forth. In addition, various different color schemes may be used to illustrate the heap map, for example, a warm-to-cool color spectrum, a rainbow color scheme, or a grayscale.

To determine an optimal delivery service location for the online order, a delivery address may be requested for the user of the user device 110. In step 220, a request for delivery address is generated by the order management device 140 and transmitted to the user device 110.

Upon receipt of the delivery address request by the user device 110, an address search window may be initiated and displayed on the display 114 of the user device 110. The address search window may be titled "please enter a delivery address" or the text "please enter a delivery address" may be displayed in the body of the address search window. The address search window may be superposed on the map displayed on the display 114, or may be displayed in a portion of the display 114 that is not occupied by the displayed map. The address search window may comprise a search field where a delivery address can be entered by the user. Upon entering and confirmation by the user of a delivery address, the entered delivery address is transmitted from the user device 110 to the order management device 140 as a response message to the request for delivery address.

In step 225, upon receipt of the delivery address by the order management device 140, the order management device 140 may be configured to query via the microservice repository layer 1432 the received delivery address to determine whether a local service area polygon includes the received delivery address. The query for the received delivery address may be performed by querying the latitudes and longitudes of the one or more local delivery service area polygons. The latitude and longitude of the received delivery address may be compared to the latitudes and longitudes of the one or more local delivery service area polygons and/or the latitude and longitude of each local delivery service location available in the one or more local delivery service area polygons, whereby to determine whether the received delivery address is located in a local delivery service area polygon.

If the received delivery address is determined to be in a local delivery service area polygon, a confirmation message may be generated by the order management device 140 and transmitted to the user device 110 to confirm the occurrence of the received delivery address in that local delivery service area polygon. The confirmation message may displayed on the display 114 of the user device 110 as a popup message saying "the delivery address is confirmed to be located in a local delivery service area." Upon the confirmation of the received delivery address, the order management device 140 may update the one or more local service area polygons, for example, to update or regenerate the heat map to focus on the available local service locations in that local delivery service area polygon with respect to the received delivery address. For example, the distance of each available local service locations in that polygon may be recalculated with respect to the delivery address, and each of the available local service locations may be displayed accordingly with different colors in the heat map based on the recalculated distance. The updated polygons may then be transmitted to the user device 110 from the order management device 140 to update the map displayed on the user device.

If the received delivery address is determined not to be in a local delivery service area polygon, a message may be sent from the order management device 140 to the user device to indicate that the entered delivery address is not located in a local delivery service area polygon. The user may then be requested to enter a new delivery address that is likely located in a local delivery service area polygon. Upon entering a new delivery address, the above process may be repeated to determine whether the new delivery address is located in a local delivery area polygon.

In some embodiments, upon determination of the entered delivery address being located in a local service area polygon, the map displayed on the user device 110 may be updated to only display the available local service locations in that local service area polygon corresponding to the entered delivery address. Alternatively, the map displayed on the user device 110 may be updated to gray out (e.g., deactivate or designate as being non-selectable) or set as invisible the local service locations in the local service area polygons other than that local service area polygon corresponding to the entered delivery address. That is, only the local service locations in that local service area polygon corresponding to the entered delivery address are displayed or available for the user to select from to be a delivery location for the online order.

In some embodiments, upon determination of the entered delivery address being located in a local service area polygon, the map displayed on the user device 110 may be updated to display with a ranking the available local service locations in that local service area polygon corresponding to the entered delivery address. For example, the ranking may be based on a distance from the entered delivery address to each of the available local service locations in that local service area polygon, that is, based on how close each of the available local service locations is from the entered delivery address. An available local service locations in that local service area polygon having a shorter distance from the entered delivery address may be ranked with a higher preference or recommendation score. In another example, the ranking may be based on the size of each of the available local service locations in that local service area polygon, for example, the square footage occupied by each of the available local service locations or the number of employees working at each of the available local service locations. An available local service locations in that local service area polygon having a larger square footage or a larger number of employees may be ranked with a higher preference or recommendation score. The ranking associated with each of the available local service locations may be tagged and displayed on that corresponding local service location.

In some embodiments, if the user decides to change an already-selected/recommended local service location or is not satisfied with any one of the available local service locations in that local service area polygon, the order management device 140 may be configured to provide a choice or suggestion for additional delivery locations based on the delivery time, for example, "try NYC instead of NJ for more delivery or pickup locations—there are more branches there." Such choice or suggestion is transmitted to the user device 110 such that the user is able to make a preferred decision based on the provided choice or suggestion.

In some examples, in step 230, a request for delivery time is generated by the order management device 140 and transmitted to the user device 110. Upon receipt of the delivery time request by the user device 110, a time entering window may be initiated and displayed on the display 114 of the user device 110. The time entering window may be titled "please enter a delivery time", or the "please enter a delivery time" may be displayed in the body of the time entering window. The time entering window may be superposed on the map displayed on the display 114, or may be displayed in a portion of the display 114 that is not occupied by the displayed map. The time entering window may comprise a text field where a delivery time can be entered by the user. Upon entering and confirmation by the user of a delivery time, the entered delivery time is transmitted from the user device 110 to the order management device 140 as a response message to the request for delivery time.

In step 235, upon receipt of the delivery time by the order management device 140, the order management device 140 may be configured to query via the microservice repository layer 1432 the received delivery time to determine whether the received delivery time matches with the business hours of one or more of the available local service locations in that local service area polygon corresponding to the entered delivery address. The query for the received delivery time may be performed by querying the business hours or availability of the available local service locations in that local service area polygon. In some embodiments, business hours or open/availability times of each local service location offered by the order management device 140 may be hard coded into an associated application code base in the microservice repository layer indicating, for example, what service locations are open at what times. In other embodiments, the business hours or open/availability times of each local service location offered by the order management device 140 may be subject to change, for example, based on events or holidays occurring at the local service locations. The received delivery time may be compared to the open/availability times of the available local service locations in that local service area polygon, whereby to determine whether the received delivery time matches the open/availability times of one or more of the available local service locations in that local service area polygon.

If the received delivery time is determined to matches the open/availability times of one or more of the available local service locations in that local service area polygon, a confirmation message may be generated by the order management device 140 and transmitted to the user device 110 to confirm the received delivery time. The confirmation message may displayed on the display 114 of the user device 110 as a popup message saying "the delivery time is confirmed." Upon the confirmation of the received delivery time, the order management device 140 may configured to further update the map displayed on the user device 110, for example, to update or regenerate the heat map to focus on the one or more of the available local service locations in that local delivery service area polygon with respect to the received delivery time. For example, each of the available local service locations in that local delivery service area polygon may be displayed accordingly with different colors in the heat map based on their corresponding open/availability times.

If the received delivery time is determined not to match the open/availability times of any one of the available local service locations in that local delivery service area polygon, a message may be sent from the order management device 140 to the user device to indicate that the entered delivery time is not available. The user may then be requested to enter a new delivery time that is likely to match the open/availability times of one or more of the available local service locations in that local delivery service area polygon. Upon entering a new delivery time, the above process may be repeated to determine whether the new delivery time match the open/availability times of one or more of the available local service locations in that local delivery service area polygon.

In some embodiments, upon determination of the entered delivery time matching the open/availability times of one or more of the available local service locations in that local delivery service area polygon, the map displayed on the user device 110 may further be updated to only display the one or more of the available local service locations in that local service area polygon corresponding to the entered delivery time. Alternatively, the map displayed on the user device 110 may be further updated to gray out (e.g., deactivate or designate as being non-selectable) or set as invisible the local service locations in that local service area polygon other than the one or more of the local service area locations corresponding to the entered delivery time. That is, only the local service locations in that local service area polygon corresponding to the entered delivery time are displayed or available for the user to select from to be a delivery location for the online order.

In some embodiments, upon determination of the entered delivery time matching the open/availability times of one or more of the available local service locations in that local delivery service area polygon, the map displayed on the user device 110 may be further updated to display with a ranking the one or more of the available local service locations in that local service area polygon corresponding to the entered delivery time. For example, the ranking may be based on a duration of the open/availability times of one or more of the available local service locations in that local delivery service area polygon, that is, an available local service location having a shorter duration of open/availability time may be ranked with a lower preference/a lower recommendation score. The ranking associated with each of the one or more of the available local service locations may be tagged and displayed on that corresponding local service location.

In some embodiments, if the user decides to change an already-selected/recommended local service location or is not satisfied with any one of the one or more of the available local service locations in that local service area polygon, the order management device 140 may be configured to provide a choice or suggestion for additional delivery locations based on the delivery time, for example, "try NYC instead of NJ for more delivery or pickup times—our branches are open later there." Such choice or suggestion is transmitted to the user device 110 such that the user is able to make a preferred decision based on the provided choice or suggestion.

Further in step 235, an optimal local delivery service location may be determined based on the confirmed delivery address and the confirmed delivery time. For example, if there have only one available local service location in that local service area polygon corresponding to the confirmed delivery address and the confirmed delivery time, then that only one available local service location can be determined to be the optimal local service location, which may be recommended to the user by the system of the present disclosure or may be selected by the user for the local delivery location of the online order. If there have more than one available local service locations in that local service area polygon corresponding to the confirmed delivery address and the confirmed delivery time, then the optimal local service location may be determined from the more than one available local service locations, for example, the optimal local service location may be determined to be a local service location of the more than one available local service locations that is nearest in distance from the confirmed delivery address and also is open for business with respect to the confirmed delivery time. As described above, addresses and latitudes and longitudes of local service locations may be hard coded into code base of the associated application or service in the microservice repository layer, such that the distance to the confirmed delivery address from each local service location can be calculated and may be stored in the memory 142 of the order management device 140 or in the order management database 150.

It is apparent that other factors may be taken into account for determining the optimal local service location, for example, the number of employees working at a local service location. Further, if the user prefers to get the online order delivered as early as possible, the optimal local service location may be determined and recommended to be a local service location with an earlier business open time even thought that local service location may be farther from the confirmed deliver address. Various factors can be considered when determining and recommending an optimal local service location.

In step 240, upon recommendation/selection of the optimal local delivery service location, the order management device 140 may transmit to the courier device 160 information regarding the online order along with the optimal local service location. The information regarding the online order along with the optimal local service location may be stored in the memory 162 of the courier device 160 and/or in the courier database 170. A courier associated with the courier device 160 may be dispatched to deliver the online order from the merchant to the optimal local service location.

In step 245, when the online order is delivered at the optimal local service location, the dispatched courier may inform via the courier device 160 the user of the delivery of the online order, for example by a push notification from the application 163 of the courier device 160 to the application 113 of the user device 110. Upon receipt of the notification, the user may go picking up the online order at the optimal local service location. Alternatively, the online order may be further transported from the optimal local service location to the confirmed deliver address via a local courier.

In some embodiments, upon completion of the delivery of the online order by the dispatched courier, in step 250 a notification may be communicated from the courier device 160 to the order management device 140. The notification may be forwarded by the order management device 140 to the user device 110 in step 255. Alternatively, upon receipt by the order management device 140 of the notification transmitted from the courier device 160, a new notification indicative of the delivery of the online order may be generated by and transmitted from the order management device 140 to the user device 110.

Figure 3:
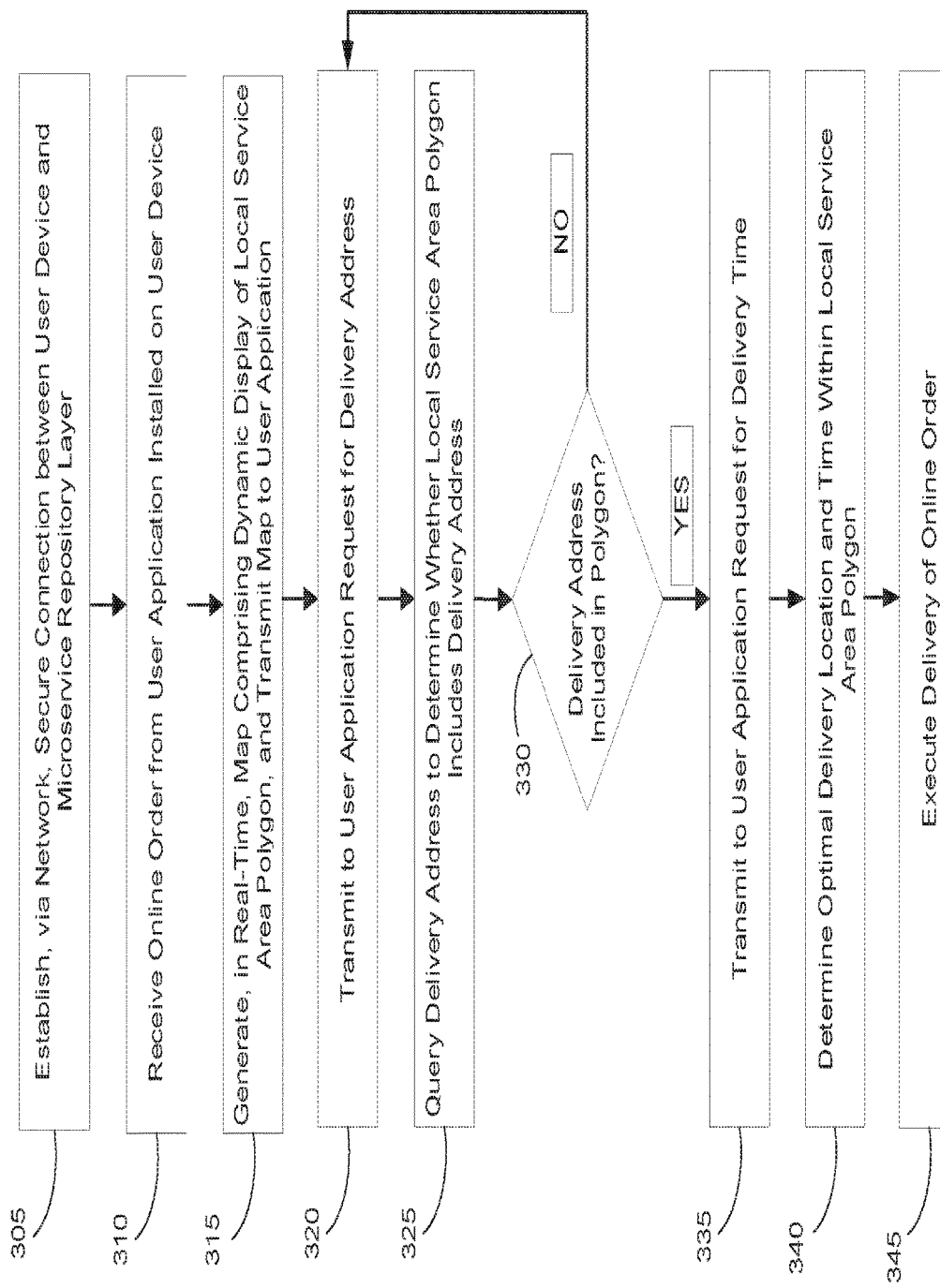
FIG. 3 is a flow chart illustrating a method of determining an optimal local service location based on delivery address and time according to an example embodiment.

FIG. 3 is a flow chart illustrating a method 300 of determining an optimal local service location according to an example embodiment. FIG. 3 may reference the same or similar components as those illustrated in FIGS. 1 and 2, including a user device, a merchant device, an order management device, a courier device, and databases associated with those devices. Similarly, some details in the blocks of the method 300 may be referred back to the details described above, and may not be repeated herein.

The method 300 may commence at block 305, where a microservice repository layer of the order management device establishes via a network a secure connection with the user device. The secure connection may be established between the microservice repository layer and a user application of the user device.

In block 310, the microservice repository layer receives an online order from the user application installed on the user device. A user of the user device may place the online order through the user application of the user device from the merchant device. The merchant device may host an online shopping website on which the user place the online order. The online can be received by the order management device. Upon receipt of the online order, the order management device may store information regarding the online order in its associated memory or database, which may be located internally or externally to the order management device.

In block 315, the microservice repository layer generates, in real-time, a map comprising a dynamic display of local service area polygons, and transmits the map to the user application. The local service area polygons may encompass a general delivery area offered by the merchant. One or more local service locations may be tagged inside a local service area polygon. The local service area polygons may be generated based on the information regarding the online order. For example, the local service area polygons may be generated based on a mailing address, a billing address, a zip code, a city, a county, and/or a telephone number. A generated local service area polygon may encompass an area corresponding to a zip code coverage, a county coverage, a town coverage, or a state coverage. The latitudes and longitudes of the local service area polygons may be hard coded into the microservice repository layer.

In block 320, the microservice repository layer may transmit a request for a delivery address to the user application. The request for a delivery address may be used to determine an optimal local service location in one of the local service area polygons to have the online order delivered to that optimal local service location.

Upon receipt of a delivery address from the user application, in block 325, the microservice repository layer may query the received delivery address to determine whether the local service area polygons include the received delivery address. The microservice repository layer may query the latitudes and longitudes of the local service area polygons, for example, by comparing the latitude and longitude of the received delivery address with the latitudes and longitudes of the local delivery service area polygons.

As shown in block 330, if the received delivery address is determined not to be in a local delivery service area polygonthe, option "NO" is determined and the method 300 flows back to the block 320 where the microservice repository layer may request the user to enter a new delivery address that is likely located in a local delivery service area polygon. Upon entering a new delivery address, the above blocks 325 and 330 may be repeated to determine whether the new delivery address is located in a local delivery area polygon.

If the received delivery address is determined to be in a local delivery service area polygon, the option "YES" is determined and the method 300 proceeds to the block 335 where the microservice repository layer may transmit a request for delivery time to the user application. Upon receipt of a delivery time from the user application, the microservice repository layer may query the received delivery time to determine whether the received delivery time matches with the business hours of one or more of the available local service locations in that local service area polygon corresponding to the delivery address. The query may be performed by querying the business hours or availability times of the available local service locations in that local service area polygon. In some embodiments, business hours or open/availability times of each local service location may be hard coded into an associated application code base in the microservice repository layer indicating, for example, what service locations are open at what times. In other embodiments, the business hours or open/availability times of each local service location offered by the order management device 140 may be subject to change, for example, based on events or holidays occurring at the local service locations.

If the received delivery time is determined not to match the open/availability times of any one of the available local service locations in that local delivery service area polygon, the microservice repository layer may request the user to enter a new delivery time that is likely to match the open/availability times of one or more of the available local service locations in that local delivery service area polygon. Upon entering a new delivery time, the above process may be repeated to determine whether the new delivery time match the open/availability times of one or more of the available local service locations in that local delivery service area polygon.

If the received delivery time is determined to matches the open/availability times of one or more of the available local service locations in that local service area polygon, in block 340, the microservice repository layer may determine an optimal local delivery service location based on the receive delivery address and the received delivery time. For example, if there have only one available local service location in that local service area polygon corresponding to the receive delivery address and the received delivery time, then that only one available local service location can be determined to be the optimal local service location, which may be recommended to the user. If there have more than one available local service locations in that local service area polygon corresponding to the receive delivery address and the received delivery time, then the optimal local service location may be determined from the more than one available local service locations, for example, the optimal local service location may be determined to be a local service location of the more than one available local service locations that is nearest in distance from the received delivery address and also is open for business with respect to the received delivery time.

In some embodiments, the microservice repository layer may automatically receive geolocation data from the user device via the user application (e.g., including a global positioning system). The geolocation data can be data indicative of a current location of the user operating the user device. The microservice repository may utilize the received geolocation data to determine and recommend the optimal delivery location. For example, the optimal local service location may be a local service location that is closest to the current location of the user instead of the received delivery address.

In some embodiments, the microservice repository layer may receive in real-time, availability information associated with a service location via a third party application programming interface (API) and utilize the received availability information to determine and recommend the optimal local service location and time. For example, the third party API may be an API provided by a local service location to transmit its real-time availability information to the microservice repository layer. For example, when a local service location may be closed on a particular day for a certain reason, the unavailability of this local service location on the particular day may be transmitted via the API to the microservice repository layer. The microservice repository layer may then exclude this local service location as a candidate for the optimal local service location.

In some embodiments, the microservice repository layer may receive, in real-time, a volume of customers and delivery requests associated with a local service location via a third party API and utilize the received volume information to determine and recommend the optimal local service location and time. For example, if the volume of customers and delivery requests associated with that local service location are high at or around the user desired delivery time, the microservice repository layer may determine and recommend another delivery time at that local service location.

In some embodiments, the microservice repository layer may receive real-time traffic and weather information via third party APIs and utilize the received traffic and weather information to determine and recommend an optimal delivery location and time. For example, a previously recommended optimal local service location and delivery time may be changed to another local service location and delivery time based on the real-time traffic and weather information.

In block 345, upon determination and recommendation of the optimal local service location and delivery time, the microservice repository layer may request a courier to execute the delivery of the online order from the merchant to the optimal local service location at the delivery time.

In some embodiments, the microservice repository layer may transmit, via a communication interface associated with it, a push notification to the user application on the user device. The push notification may include real time tracking of the delivery on the map including the local service area. The microservice repository layer may transmit and continuously update through communication interface, via a push notification to the user application on the user device, a real-time estimated time of arrival for the delivery.

In some embodiments, the recommendation engine 1433 of the order management device 140 may be configured to determine and recommend the optimal local service location and delivery time, the long distance courier delivering the online order from the merchant to the optimal local service location, and a local courier delivering the online order from the optimal local service location to the user's desired delivery. The recommendation engine 1433 may or may not be part of the microservice repository layer. The recommendation engine 1433 may utilize machine learning and natural language processing to process and cluster the received real time data to generate recommendations of an optimal local service location and delivery time, and an optimal courier to execute the delivery request.

Figure 4:
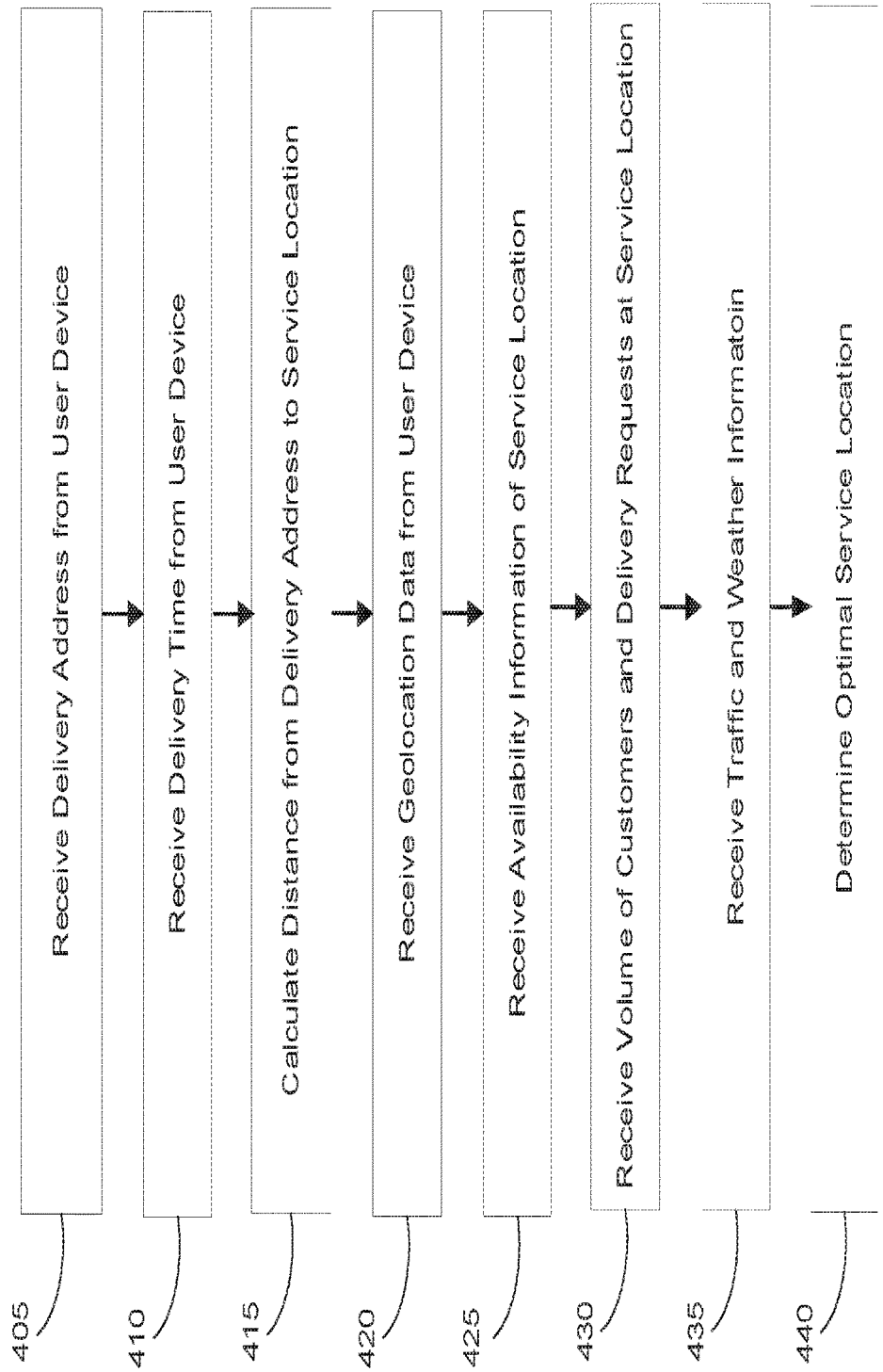
FIG. 4 is a flow chart illustrating a method of determining an optimal local service location based on delivery address and time according to an example embodiment.

FIG. 4 is a flow chart illustrating a method 400 of determining an optimal local service location by the recommendation engine 1433 according to an example embodiment. FIG. 4 may reference the same or similar components as those illustrated in FIGS. 1, 2 and 3, including a user device, a merchant device, an order management device, a courier device, and databases associated with those devices. Similarly, some details in the blocks of the method 400 may be referred back to the details described above, and may not be repeated herein.

The method 400 may commence at block 405, where the recommendation engine receives a delivery address from the user device. Prior to the receipt of the delivery address, the recommendation engine may have received an online order, for example, from the user device or the merchant device. In block 410, the recommendation engine receives a delivery time from the user device. In block 415, the recommendation engine may be configured to calculate a distance from the received delivery address to each of the local service locations in a local service arear polygon corresponding to the received delivery address. In block 420, the recommendation engine receives geolocation data of the user using the user device. In block 425, the recommendation engine receives availability information of each of the local service locations in a local service arear polygon corresponding to the received delivery address. In block 430, the recommendation engine receives volume of customers and delivery requests at each of the local service locations in a local service arear polygon corresponding to the received delivery address. In block 435, the recommendation engine receives traffic and weather information at each of the local service locations in a local service arear polygon corresponding to the received delivery address. In block 440, the recommendation engine may determine and recommend an optimal service location based on the received information above. Various machine learning techniques may be employed by the recommendation engine, including, but no limited to, gradient boosting machine, logistic regression, neural networks, decision trees, classification, and so forth.

Figure 5:
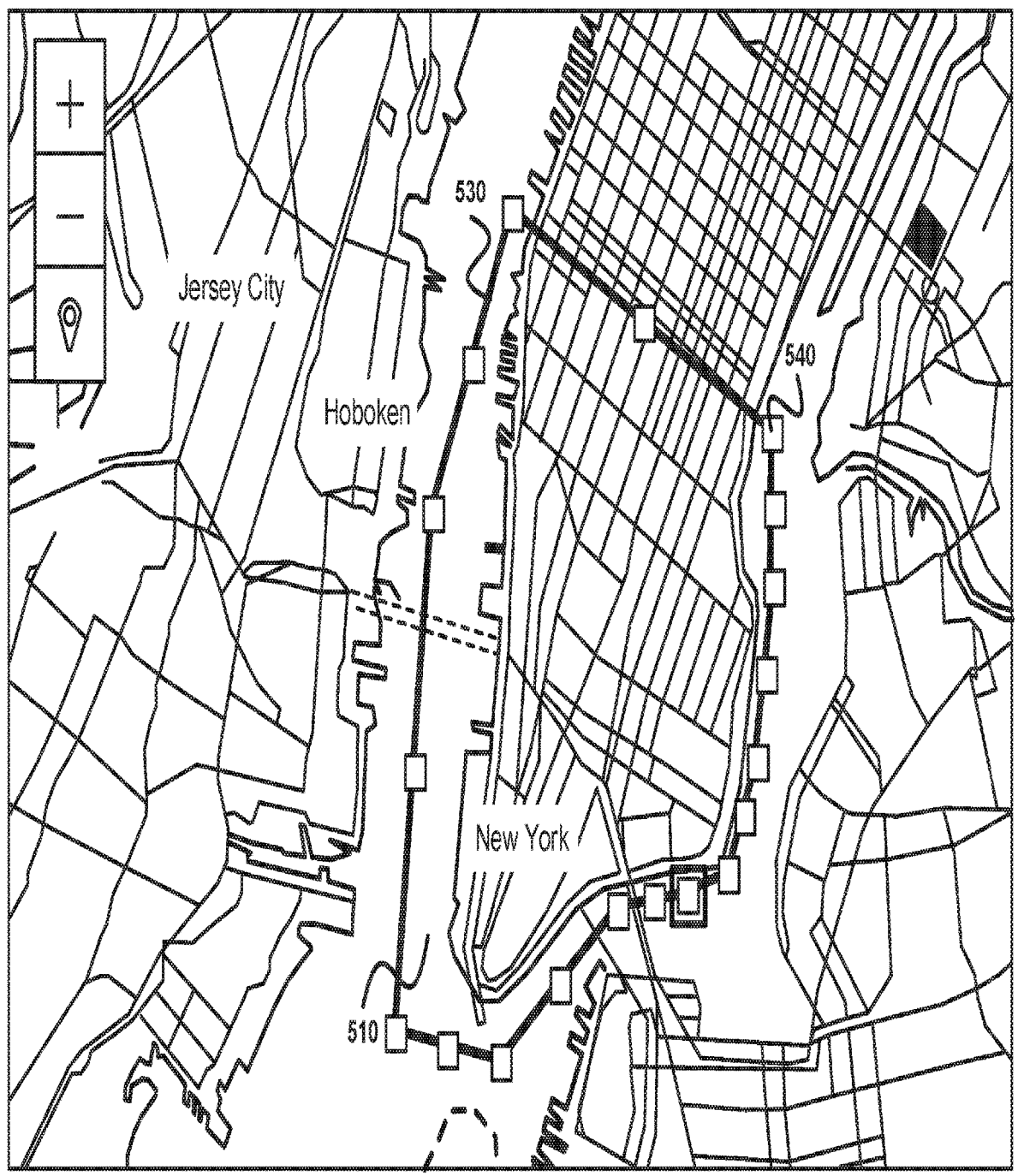
FIG. 5 is a map diagram illustrating a local service area polygon according to an example embodiment.

FIG. 5 is a map diagram illustrating a local service polygon according to an example embodiment. FIG. 5 may reference the same or similar components as those illustrated in FIGS. 1-4, including a user device, a merchant device, an order management device, a courier device, databases associated with those devices, and local service polygons. Similarly, some details in the blocks of the method 300 may be referred back to the details described above, and may not be repeated herein.

As shown in FIG. 5, a map 500 can include a local service polygon 510. The local service polygon 510 can represent a geographical area in which local service locations are identified. The local service polygon 510 can correspond to one or more zip codes, a district in a city, a town in a county, a city in a state, and the like. As described above, for example in the blocks of the method 300, the local service polygon 510 can comprise various shapes, such as circle, square, rectangle, triangle, and the like, which may correspond to a geographical area.

In some examples, the local service area polygon 510 can be automatically generated by connecting a plurality of lines 530 with a plurality of small squares 540, based on, for example a mailing address associated with an order that may be placed by a customer living in lower Manhattan. For example, upon receiving the order by the order management device 140, the order management 140 can determine the mailing address associated with the order and automatically generate the local service polygon 510 based on the mailing address. The shape and size of the local service polygon 510 can be determined based on distances of the local service locations therein from the mailing address, and can also be based on the number of the local service locations that can be included in the local service polygon 510 near the mailing address.

In some embodiments, the local service polygon 510 can be dynamically changed and displayed. A user of the user device 114 can resize the local service polygon 510, for example, by finger movement or other input (e.g., an input devices such as a mouse, trackpad, or stylus). The local service polygon 510 can be dynamically enlarged or reduced accordingly to display more details of a local delivery service area or a wider range of the local delivery service area. The user can also be allowed to enter a new location (e.g., a new address, a city name, a district name, a town name, and the like), and the local service polygon 510 can dynamically re-configure its shape and size based on the entered new location.

Terms such as "order" and "online order" are used throughout this specification. It is understood that the present disclosure is not limited to a particular type of order and may include any type of order where goods and/or services are provided at a specified location and/or time. Exemplary orders include, without limitation electronic orders placed through a website, an application, or via email, orders placed telephonically, and orders placed by a customer within a store, on a kiosk, a smartcard, or at another location.

It is further understood that the present disclosure is not limited to a particular type of merchant. Rather, the present disclosure includes any type of merchant including, without limitation, merchants, vendors, retailers, any provider of goods, and any provider of services.

The term "polygon" is used throughout this specification. It is understood that the present disclosure is not limited to a particular type of shape and the present disclosure includes any type of shape including, without limitation, polygons, circles, ellipses, oval, and other uniform or non-uniform shapes.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
    a memory;
    a security layer;
    a microservice repository layer including a processor, the processor coupled to the memory, the security layer, and an application programming interface (API) that enables transmission of real-time data, wherein the microservice repository layer is configured to:
        establish, via a network, a secure connection between a user device and the microservice repository layer,
        receive an online order from a user application installed on the user device,
        generate, in real-time, a map comprising a dynamic display of a local service area polygon associated with the online order and transmit the map to the user application,
        receive, in real-time, availability information associated with service locations contained in the local service area polygon via a third party API, and
        recommend an optimal delivery location and time for delivering the online order within the local service area polygon based on the availability information.

2. The system of claim 1, wherein the microservice repository layer is further configured to generate the map via a tile screen.

3. The system of claim 1, wherein the microservice repository layer is further configured to
    transmit to the user application a request for a delivery address for delivering the online order;
    upon receipt of the delivery address from the user application, query the delivery address to determine whether the local service area polygon includes the delivery address;
    transmit to the user application a request for a delivery time for delivering the online order; and
    upon receipt of the delivery time from the user application, automatically recommend the optimal delivery location and time within the local service area polygon based on the delivery address and delivery time.

4. The system of claim 3, wherein the microservice repository layer is further configured to query the delivery address by evaluating a latitude and a longitude of the delivery address via hardcoded polygons of an associated application code.

5. The system of claim 1, wherein the microservice repository layer is further configured to automatically receive geolocation data from the user device and to utilize the geolocation data to recommend the optimal delivery location.

6. The system of claim 1, wherein the microservice repository layer is further configured to receive, in real-time, a volume of customers and delivery requests associated with a service location via a third party API and to utilize the volume information to recommend the optimal delivery location and time.

7. The system of claim 1, wherein the microservice repository layer is further configured to receive real-time traffic and weather information via a third party API and to utilize the traffic and weather information to recommend the optimal delivery location and time.

8. The system of claim 1, further comprising a communication interface associated with the microservice repository layer, the communication interface being configured to transmit, via a push notification to the user application on the user device, real-time tracking of the delivery on the map including the local service area polygon.

9. The system of claim 8, wherein the communication interface is further configured to transmit and continuously update, via subsequent push notifications to the user application, a real-time estimated arrival time for the delivery.

10. The system of claim 1, wherein the dynamic display of the local service area polygon comprises a heat map of one or more delivery location clusters.

11. A method, comprising:
    establishing, via a network, a secure connection between a user device and a microservice repository layer;
    receiving an online order from a user application installed on the user device;
    generating, in real-time, a map comprising a dynamic display of a local service area polygon associated with the online order and transmitting the map to the user application;
    receiving, in real-time, availability information associated with service locations contained in the local service area polygon via a third party application programming interface (API); and
    recommending an optimal delivery location and time for delivering the online order within the local service area polygon based on the availability information.

12. The method of claim 11, further comprising generating the map via a tile screen.

13. The method of claim 11, further comprising
    transmitting to the user application a request for a delivery address for delivering the online order;
    upon receipt of the delivery address from the user application, querying the delivery address to determine whether the local service area polygon includes the delivery address;
    transmitting to the user application a request for a delivery time for delivering the online order; and
    upon receipt of the delivery time from the user application, automatically recommending the optimal delivery location and time within the local service area polygon based on the delivery address and delivery time.

14. The method of claim 13, further comprising querying the delivery address by evaluating a latitude and a longitude of the delivery address via hardcoded polygons of an associated application code.

15. The method of claim 11, further comprising automatically receiving geolocation data from the user device and utilizing the geolocation data to recommend the optimal delivery location.

16. The method of claim 11, further comprising receiving real-time traffic and weather information via the third party API and utilizing the traffic and weather information to recommend the optimal delivery location and time.

17. The method of claim 11, further comprising transmitting, via a push notification to the user application, real-time tracking of the delivery on the map including the local service area polygon.

18. The method of claim 17, further comprising transmitting and continuously updating, via subsequent push notifications to the user application, a real-time estimated arrival time for the delivery.

19. The method of claim 11, wherein the dynamic display of the local service area polygon comprises a heat map of one or more delivery location clusters.

20. A system comprising:
a memory;
a security layer; and
a microservice repository layer including a processor, the processor coupled to the memory, the security layer, and an application programming interface (API) that enables transmission of real-time data, wherein the microservice repository layer is configured to:
establish, via a network, a secure connection between a user device and the microservice repository layer,
receive an online order from a user application installed on the user device,
generate, in real-time, a map comprising a dynamic display of a local service area polygon associated with the online order and transmit the map to the user application,
receive, in real-time, availability information associated with service locations contained in the local service area polygon via a third party API, and
recommend an optimal delivery location and time for delivering the online order within the local service area polygon based on the availability information.

* * * * *